(12) United States Patent
Waskaas

(10) Patent No.: US 6,334,957 B1
(45) Date of Patent: Jan. 1, 2002

(54) METHOD FOR REDUCTION OF FLOW RESISTANCE IN PIPES AND DUCTS

(76) Inventor: Magne Waskaas, Sagdalsringen 43, Siljan (NO), 3748

( * ) Notice: Subject to any disclaimer, the term of this patent is extended or adjusted under 35 U.S.C. 154(b) by 0 days.

(21) Appl. No.: 09/529,221

(22) PCT Filed: Oct. 9, 1998

(86) PCT No.: PCT/NO98/00307

§ 371 Date: Apr. 10, 2000

§ 102(e) Date: Apr. 10, 2000

(87) PCT Pub. No.: WO99/19260

PCT Pub. Date: Apr. 22, 1999

(30) Foreign Application Priority Data

Oct. 10, 1997 (NO) .......................................... 19974715

(51) Int. Cl.⁷ .................................................. C02F 1/48
(52) U.S. Cl. ...................... 210/739; 210/742; 210/743; 210/746; 210/748; 210/695; 204/554; 204/555
(58) Field of Search ................................. 210/695, 748, 210/243, 222, 739, 742, 743, 746; 204/554, 555

(56) References Cited

U.S. PATENT DOCUMENTS

| | | | |
|---|---|---|---|
| 4,278,549 A | 7/1981 | Abrams et al. ............. | 210/695 |
| 4,299,701 A | 11/1981 | Garrett et al. ............... | 210/222 |
| 4,326,954 A | 4/1982 | Shroyer ....................... | 210/222 |
| 5,171,431 A | 12/1992 | Schulte ........................ | 210/94 |
| 5,304,302 A | 4/1994 | Bossert ....................... | 210/222 |
| 5,366,623 A | 11/1994 | Clair ........................... | 210/222 |
| 5,411,143 A | 5/1995 | Greene ........................ | 210/222 |
| 5,453,188 A | 9/1995 | Florescu et al. ............. | 210/222 |
| 5,480,563 A | 1/1996 | Mitsumori et al. ........... | 210/748 |
| 5,514,283 A | 5/1996 | Stefanini ..................... | 210/695 |

FOREIGN PATENT DOCUMENTS

| | | |
|---|---|---|
| EP | 0 661 237 | 7/1995 |
| GB | 1189888 | 4/1970 |
| SE | 337806 | 8/1971 |
| SE | 405687 | 12/1978 |
| WO | WO 97/14655 | 4/1997 |

Primary Examiner—David A. Reifsnyder
(74) Attorney, Agent, or Firm—Finnegan, Henderson, Farabow, Garrett & Dunner, L.L.P.

(57) ABSTRACT

This invention relates to a method and an apparatus for reduction of flow resistance in pipes and ducts where a fluid or a powder is flowing in single or multiphase. In the method, the flow resistance is reduced by applying an electrical field on the pipe or duct wall. Also, the strength of the field is regulated according to measurements of the flow regime before and after the unit which exposes the fluid or powder to the electrical field. The fluid may be a pure fluid, colloidal fluid or contain inclusions in the form of particles.

9 Claims, 6 Drawing Sheets

Fig. 2 REFERENCE [2]

Fig.3 REFERENCE [3]

METHOD FOR REDUCTION OF FLOW RESISTANCE IN PIPES AND DUCTS

This invention relates to a method and an apparatus for reduction of flow resistance in pipes and ducts where a fluid or a powder is flowing in single or multiphase. In the method, the flow resistance is reduced by applying an electrical field on the pipe or duct wall. Also, the strength of the field is regulated according to measurements of the flow regime before and after the unit which exposes the fluid or powder to the electrical field. The fluid may be a pure fluid, colloidal fluid or contain inclusions in the form of particles.

BACKGROUND

Many important industrial processes and community works involve transport of fluids in pipes. Examples are among others, supply of water to hydro-electric power stations, waterworks, water purification plants, and sewage treatment el. purification plants, or the distribution net for district heating plants, transport of oil and gas in pipes, and process-lines in process chemistry, food industry and petrochemical industry.

A common problem connected with all forms of transport of fluids in pipes and ducts, is the loss of fluid pressure due to the flow resistance. This pressure loss causes loss of energy for all processes which includes pipe transport of fluids. For larger transport distances, this may become an important economical factor since the pressure loss must be compensated by regeneration of the fluid pressure by one or several pumping stations. Thus, it is both from an environmental and economical point of view of interest to reduce the flow resistance.

STATE OF THE ART

It has been known since the nineteenth century that by imposing a magnetic field to water flowing in a pipe, the formation of calcareous deposits on the inner walls of the pipe can be reduced and/or avoided. This effect is thoroughly discussed in American Petroleum Institute Publication 960, September 1985. Although there are similarities between this effect and the present invention, both the aim and means are sufficiently distant that this has only restricted resemblance with the present invention.

The flow velocity of a fluid which is flowing through a pipe/duct will vary along the cross section of the pipe/duct. The highest velocity is achieved in the middle and the lowest at the boundary between the fluid and the wall of the pipe/duct. Typical velocity profiles for laminar and turbulent flow in pipes [1] is given in FIG. 1.

The shape of the velocity profile is determined by the Reynolds number and the friction factor for the fluid flow. The Reynolds number is determined by the density of the fluid, dynamic viscosity, average flow velocity, and the diameter of the pipe/duct. If the Reynolds number is less than 2300 the flow becomes laminar (parabola shaped velocity profile) and turbulent if it is above 2300. The friction factor is determined by the roughness of the pipe/duct wall and the Reynolds number. The roughness is a complex quantity which depends on parameters such as the shape of the pipe/duct wall, size, physical character of the surface, and electrical conditions [2]. All these parameters tend towards reducing the flow velocity. The roughness is normally determined by measurements of fluid pressure loss. The roughness as a function of the Reynolds number and friction factor for a number of materials is given as a Moody diagram [2] in FIG. 2.

It is also known that when a piece of metal is submerged in water, some of the metal will be dissolved as positive metal ions and the metal piece becomes negatively charged. Due to electromagnetic attraction, a layer of positively charged metal ions, hydrogen ions (dependent on pH), other positively charged ions present in the water, an d polar molecules with the positive end facing the metal piece will be formed [3]. An illustration if this layer is given in FIG. 3. A voltage which and can be measured in relation to a standard reference cell (for instance a standard calomel electrode, SCE) is thus forming across this layer, and is named the corrosion potential [4]. The layer, which is called the electrical double layer, has a thickness in the order of $10^{-9}$m. Although the potential across the layer is in the order of IV, the electrical field is very large in the order of $10^9$V/m [3].

To maintain the corrosion potential, a small current of ions from the solution to the electrode has to occur, and a concentration gradient will then be established. This concentration gradient is called the diffusion layer, and has a thickness of about 0.1 mm. The thickness depends on the stirring rate, or flow velocity. The higher stirring rate, or flow velocity the thinner the diffusion layer will be, The thinner diffusion layer, the higher current of ions to the electrode, and hence, the higher corrosion potential [3].

EP 0 661 237 A1 discloses a method for preventing deposition of calcium and magnesium scale on pipe walls by imposing a DC electric potential for ionisation of the fluid. However, ionisation of the fluid will enlarge the corrosion potential and this method is therefore not relevant for this invention.

U.S. Pat. No. 5 480 563 discloses a method for removing electrostatic charges which builds up in highly resistivity liquids without contacting the liquid in order to avoid polluting it. An example of a such liquid is extreme pure water employed in the manufacture of semiconductor devices and liquid crystal devises. It is known that such water can be charged up to 1000V after passing a teflon-based pipe, and may be damaging to the device under production. The solution is to employ electrodes covered with a thin inert layer that allows tunneling electrons to pass into the liquid. However, the large a potentials needed to perform this task will inevitably increase the corrosion potential and thereby the flow resistance, and is therefore not relevant for this invention.

The idea which the present invention is based on is that the gathering of ions and polar molecules at the fluid-wall boundary due to the corrosion potential will increase the friction factor and thus slow down the fluid flow.

OBJECT OF THE INVENTION

A general object of this invention is, to provide a method which prevents the increase of the friction factor due to the corrosion potential present between a flowing fluid and the wall of a pipe/duct, and thus to reduce the loss of pressure for fluids flowing:,in a pipe/duct.

Another object of this invention is to provide an apparatus for carrying out the method.

SUMMARY OF THE INVENTION

The general idea of this invention is that the build-up of ions at the fluid-solid boundary can be counteracted by imposing a DC electric potential on the pipe/duct wall. The magnitude of the potential should be such that it exactly balances the build-up of electrical charges on the wall. Then the electromagnetic force that attracted the ions and polar molecules will diminish, and the ions and polar molecules may freely follow the flowing fluid. In other words, the electrical contribution to the friction factor becomes zero.

A reversed situation occurs if the imposed electric potential becomes larger than the build-up of electrical charges. Then there will be a build-up of electrical charges with opposite values on the pipe/duct wall, and ions (with opposite charges) and polar molecules (with the opposite end facing the wall) will adhere to the wall and thus increase the friction factor. It is therefore important to find the magnitude of the imposed electrical potential which balances the build-up of electrical charges.

The object of the invention is achieved for instance by an embodiment as shown schematically in FIG. 4. The Figure shows a pipe in which a fluid is flowing in the direction of the arrow. A short part of the pipe wall is electrically insulated form the rest of the pipe wall in both ends. The inner diameter of the pipe and the insulated part of the pipe should be equal in order not to disturb or to introduce Unnecessary pressure losses in the fluid flow. A DC electric potential generator is connected with one polarity to the insulated pipe part and the other polarity to the pipe downstream of the insulated part or to another insulated part of the pipe downstream the first insulated part This insulated part is similar to the first insulated part. The DC electric potential generator is continuously regulated by a regulating unit which reacts to measurements of the fluid quality anywhere upstream of the part of the pipe which is exposed to the electrical potential. This ensures that the system can impose the correct value of the electrical potential regardless of which fluids employed and of eventual changes in the flow By the quality of the fluid we mean quantities such as fluid flow velocity, corrosion potential for the actual pipe, pH, concentration of specific ions, electrical conductivity, pressure, and fluid temperature. The regulating unit may employ some or all of these measured quantities when calculating the correct value of the imposed electrical potential, The regulating unit may be a standard computer unit which receives the measured data and which can control the DC electric potential generator.

DETAILED DESCRIPTION OF THE PREFERRED EMBODIMENT

Figure 1:
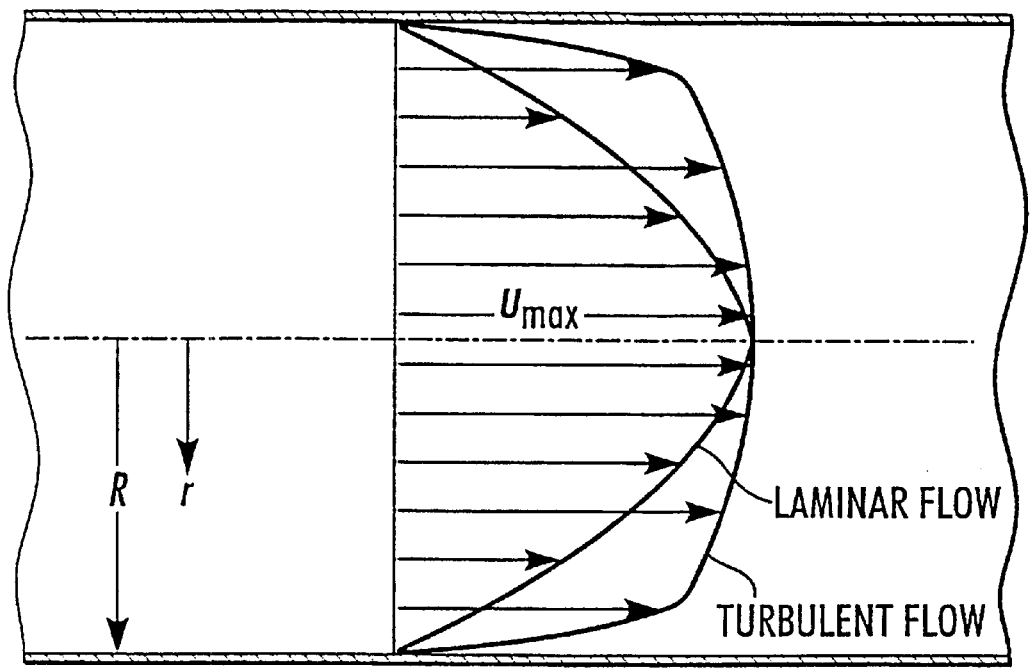
FIG. 1 is a drawing of typical velocity profiles for a laminar and a turbulent flow in pipes.
Figure 2:
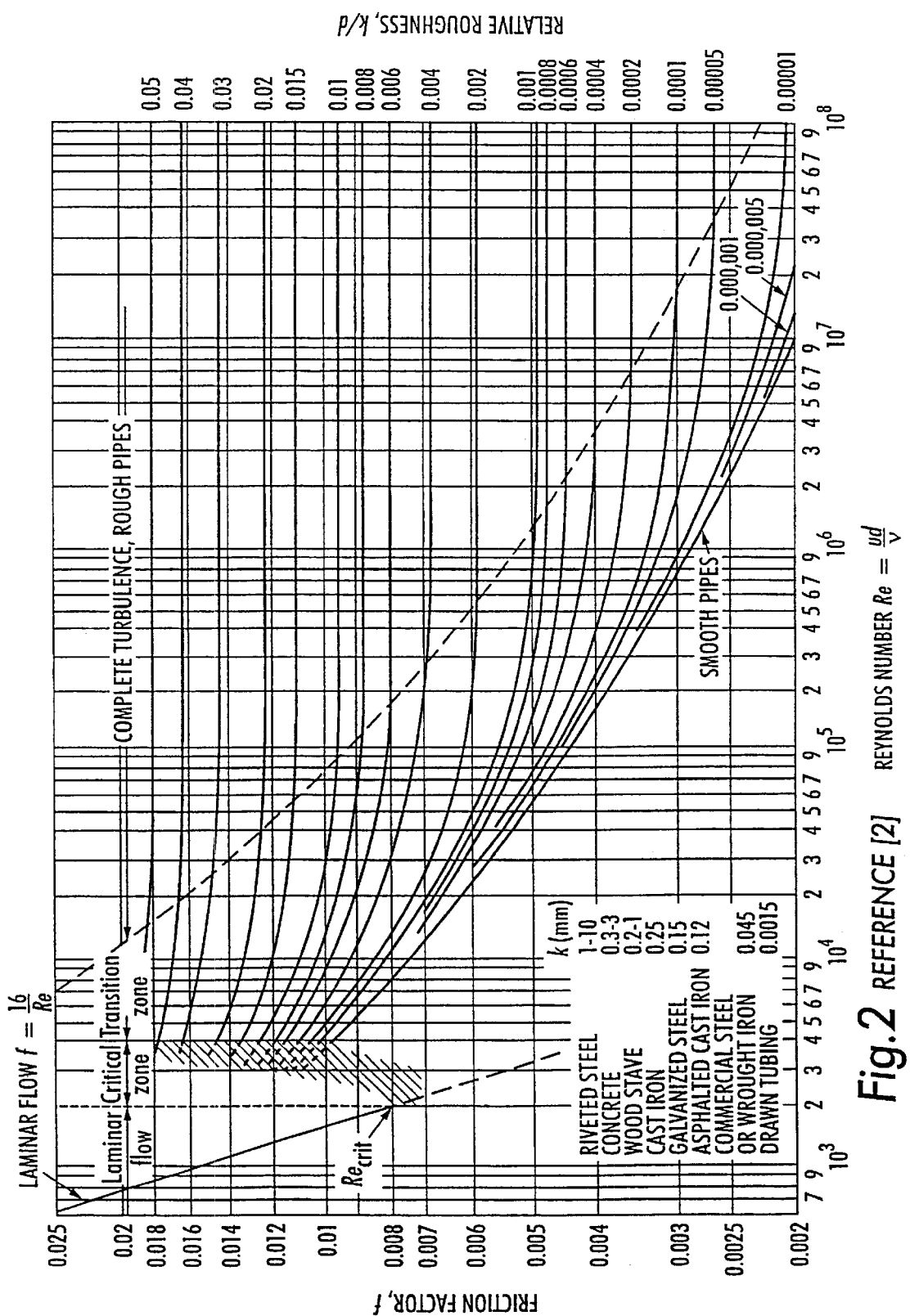
FIG. 2 is a Moody diagram which shows the relative roughness for a number of material as a function of the friction factor and Reynolds number.
Figure 3:
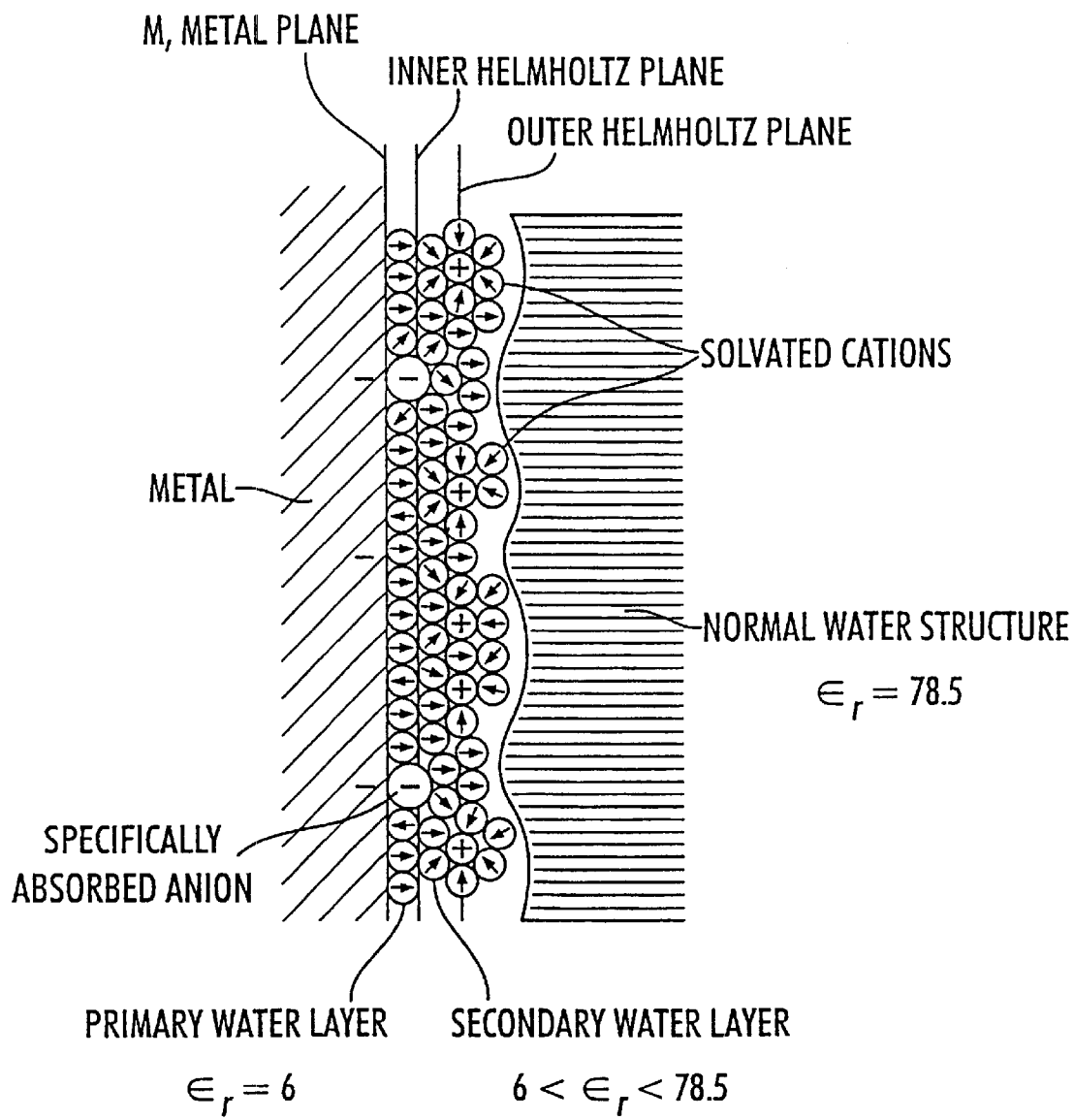
FIG. 3 shows the electric double layer.
Figure 4:
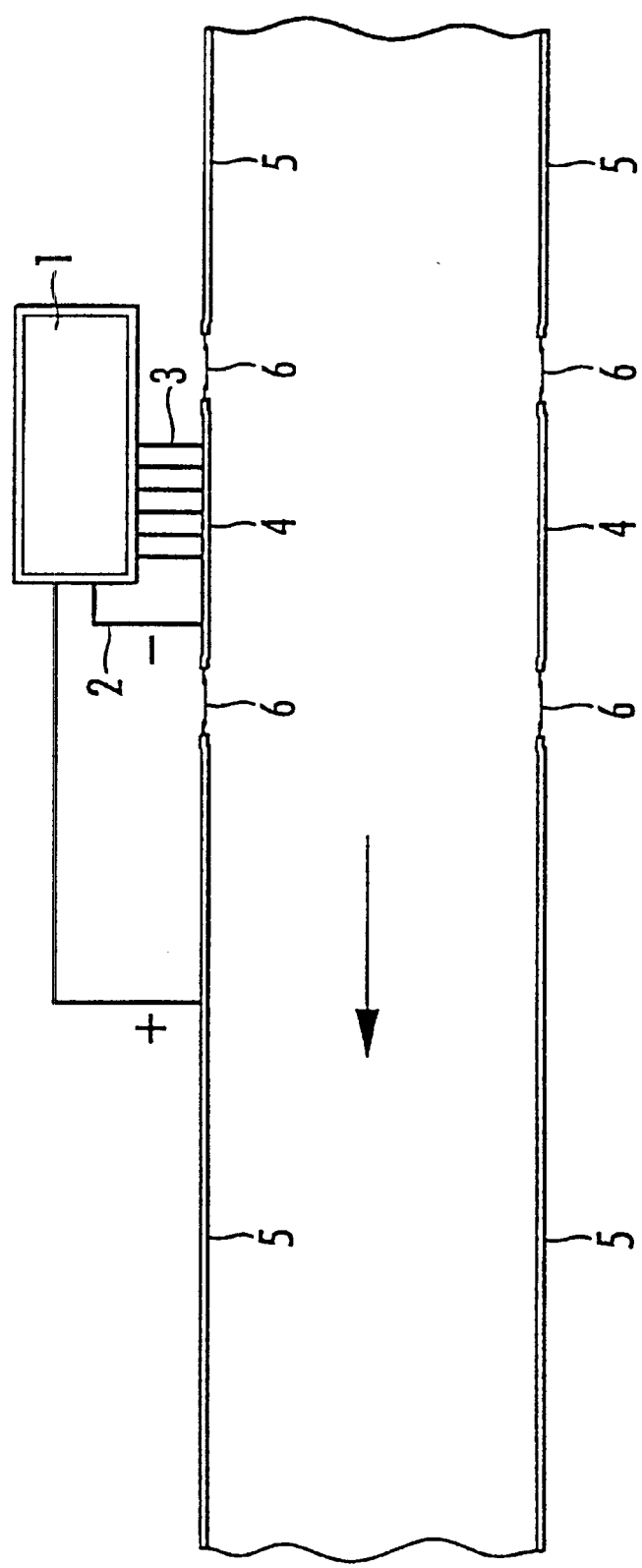
FIG. 4 is a schematic drawing of a preferred embodiment of the apparatus according to this invention.

In the preferred embodiment given schematically in FIG. 4 reference numeral 1 is the regulating unlit with an integrated DC generator, 2 is the conductors for transmitting the electrical potential, 3 is the conductors for transmitting the measured data to the regulating unit, 4 is the insulated part of the pipe, 5 is the rest of the pipe, and 6 is the electric insulators. The arrow indicates the flow direction. The sensors for measuring the flow quality are placed on the insulated part of the pipe 4 (not shown).

The insulated pipe part can be up to 50 cm long and have mounted sensors for measuring fluid flow velocity, corrosion potential, pH, ion concentration, electrical conductivity, and water temperature. The insulated pipe part should be placed shortly after the pipe inlet but sufficiently distant to ensure that the flow has been stabilized. The regulating unit, electric conductors, DC electric potential generator and sensor for measuring the fluid quality may all be of standard type and will not be described in further detail. One should however keep in mind that the shape and placement of the sensors should be such as not to significantly disturb the fluid flow.

As mentioned the object of this invention is to eliminate the electric contribution to the friction factor by imposing an electric potential on the pipe wall that balances the build-up of electrical charges on the pipe wall. In the preferred embodiment, this is done by connecting one polarity from the DC generator to the pipe wall that is downstream of the unit and the other polarity to the insulated pipe part. A positive electrical field corresponds to connecting the positive polarity from the generator to the pipe wall 5 and the negative polarity to the insulated pipe part 4.

The applied electrical potentials are close but not equal to the corrosion potentials. A number of different corrosion potentials for different materials in sea water is given in Table 1 [4]. From the table one sees that the corrosion potential is in the range 0 to −1 V. Experiments performed by the inventor indicate a dependence on the Reynolds number, but the exact nature of the build-up of electrical charges on pipe walls are not presently known. The experiments indicate however that the implied potential should be in the order of ±1.5 V. For fresh water flowing in steel pipes employed in hydro-electric power stations, the electric potential should be in the range 550–650 mV and for oil flowing in the same steel pipes in the range 100–150 mV. All potential are relative to a standard calomel electrode, SCE. The invention can be employed for flows with Reynolds numbers in the range 1 to 5000000, and all sorts of fluids such us fresh water, sea water, oil, gases, powders and a mixture of one or more of these in single or multiphase.

EXPERIMENTAL VERIFICATION

Figure 5:
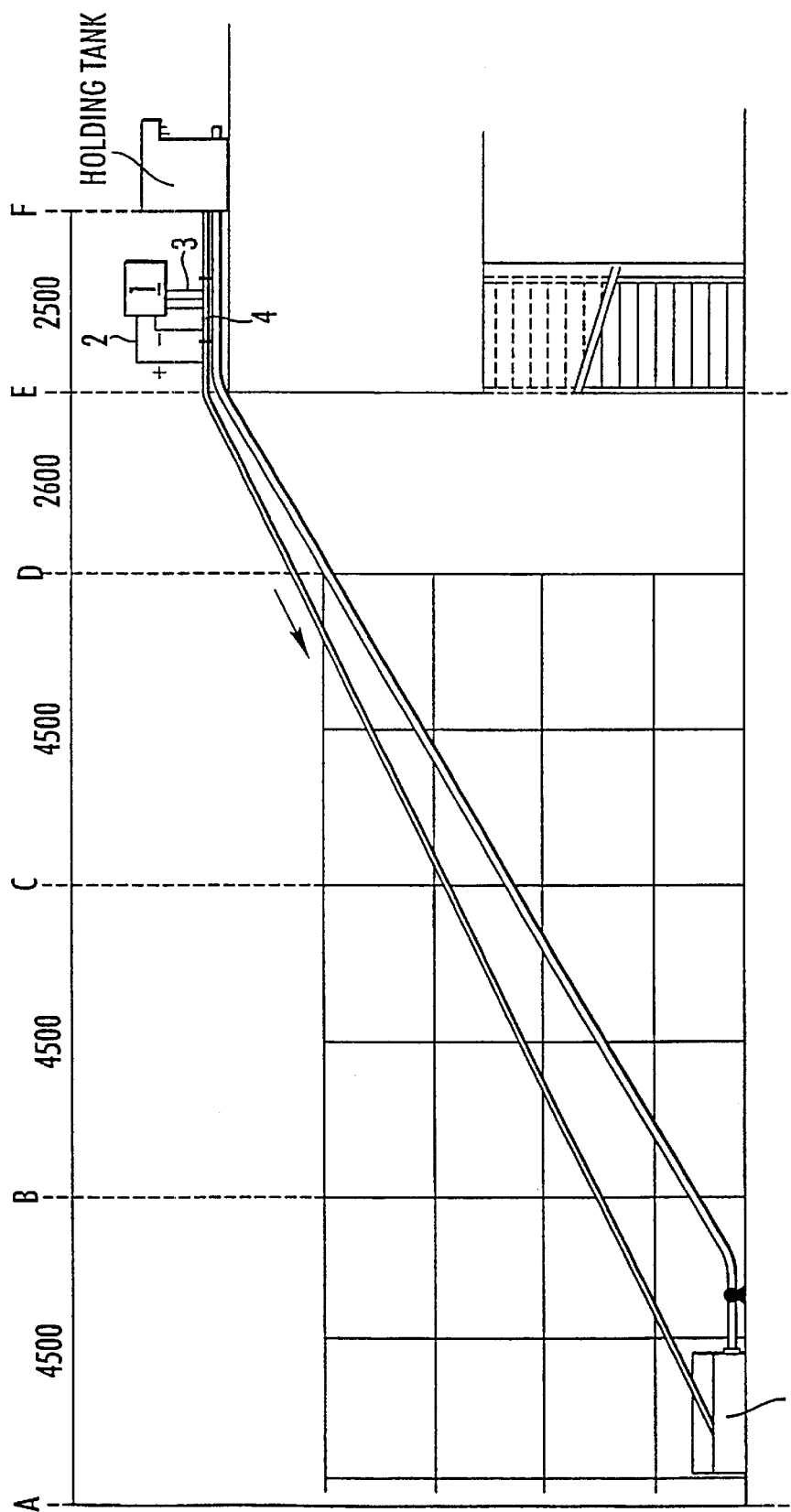
FIG. 5 is a drawing of the experimental set-up for measurements on the effect of exposing fresh water flowing in a steel pipe.

In order to verify the effect of the imposed electric potential, an experimental rig such as the one given in FIG. 5 was employed. Fresh water was flowing from a holding tank, through a 50 mm diameter tube of stainless steel and into a collector tank. The length of the steel tube after the insulated part was 17.5 m and the fall was 8 m. The insulated pipe was placed approximately 1.5 m after the inlet (outlet from the holding tank). The water in the collector tank was pumped through a separate pipe back to the holding tank such that the flow constitutes a closed loop.

The water flow was monitored at the insulated pipe part by measuring The average flow velocity, water temperature, pH, and electric conductivity. In addition the flow velocity profile at the lower part of the pipe approximately 1 m before the pipe outlet and the pressure drop in the flow along the pipe was measured. The flow was also monitored by acoustic measurements. A Laser Doppler Anemometer Was employed in the flow velocity profile measurements. The measured values were analysed by multivariate calibration.

Figure 6:
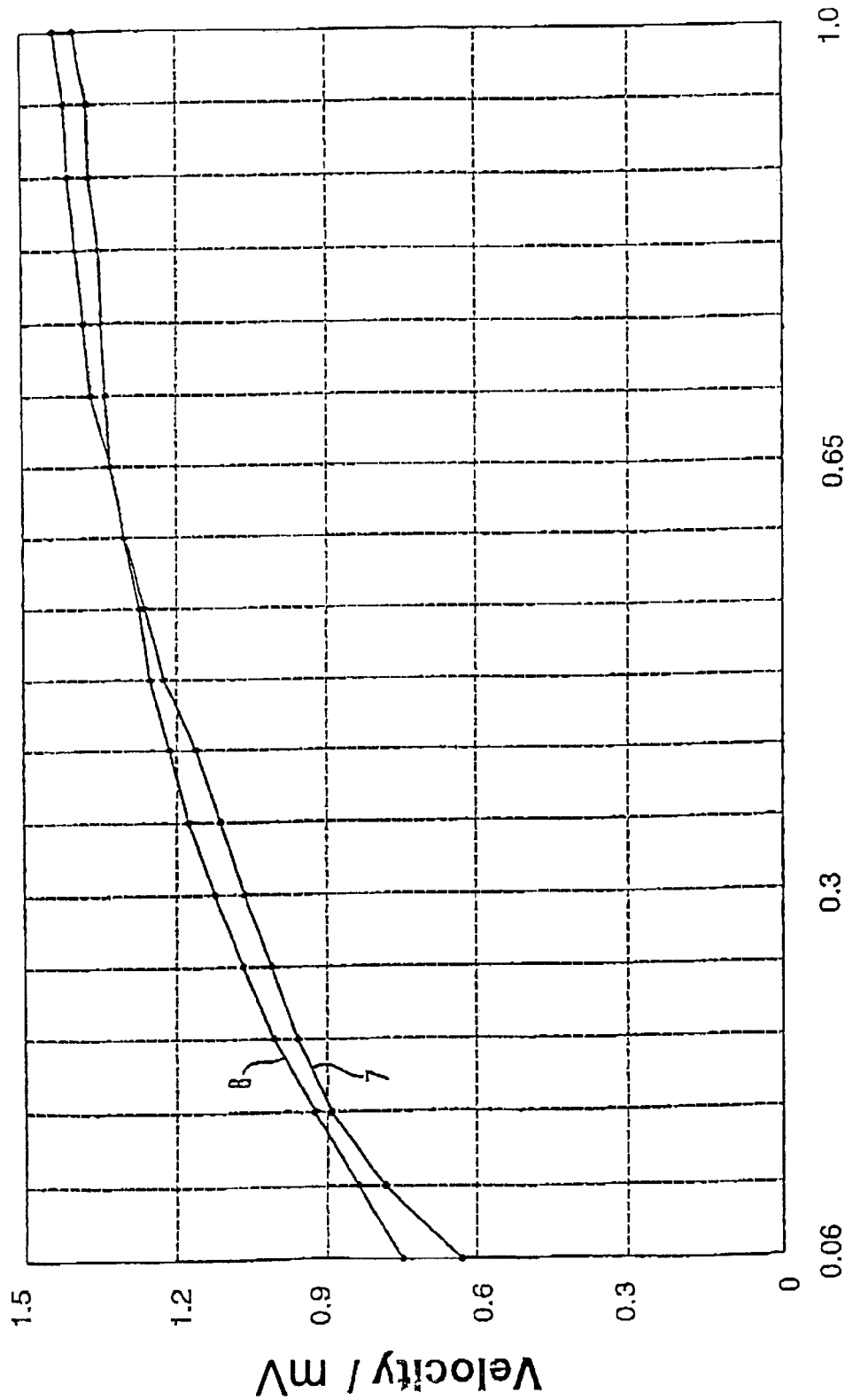
FIG. 6 shows a measured flow velocity profile for fresh water streaming in a steel pipe with and without exposure to the electric potential. The Reynolds number was 50 000.

The measurements showed that for a flow with Reynolds number 50000, the imposed electrical potential had effect upon the flow resistance from 50 to 100 mV (SCE) All other voltages gave no significant effect The corrosion potential was measured to 55 mV (SCE). An example of the effect is given FIG. 6 which shows the measured flow velocity profile with and without exposure to an imposed electric potential of +75 mV (SCE). The profile is given from the pipe wall to the centre of the pipe. The profile without exposure to the imposed electrical potential is marked with numeral 7 and the profile with exposure with numeral 8. As can be seen from the figure, the flow velocities increases at the wall and decreases at the centre but the overall effect in this case is an increase in the average flow velocity of 2.3%. In other experiments, an increase in average flow velocity of more than 5% has been observed.

It should be noted that there are a time dependency in this system, and the effect might take time before it is visible. For this rig, it took 20 minutes before the effect began to be visible and nearly 1.5 hours before it reached its maximum.

Although the invention has been described as an example of fresh water flowing in a pipe of stainless steel, it should be understood that the invention embraces a general method for removing the electric contribution to the friction factor for all flows, including streams of particles. Also, the invention is not restricted to specific applications but is intended to be employed for all applications were loss of fluid pressure in pipes/ducts constitutes a problem.

REFERENCES

1) Gerhart, P. M. and Gross, R. J., "Fluid Mechanics", Addison-Wesley, Reading, Mass., 1985.
2) Massey, B. S., "Mechanics of fluids", Van Nostrand Reinhold, London, 1989.
3) Bockris, J. O. M., Bonciocat, N., and Gutmarm, F., "An introduction to electrochemical science", Wykeham, London, 1974.
4) Delinder, van L. S. "Corrosion basics", National Association of Corrosion Engineers, Houston, Tex. 1984.

TABLE I

[4] Galvanic Series of Various Alloys in Seawater Flowing at 4 m/s (23 to 27° C.)

| Material | Days in Test | Potential, volt vs SCE[1] |
|---|---|---|
| Zinc | 5.7 | 1.03 |
| 2% Ni Cast Iron | 16 | 0.68 |
| Cast Iron | 16 | 0.61 |
| Carbon Steel | 16 | 0.61 |
| Type 430 Stainless Steel (Active) | 15 | 0.57 |
| Ni-Resist Type 2 | 16 | 0.54 |
| Type 304 Stainless Steel (Active) | 15 | 0.53 |
| Type 410 Stainless Steel (Active) | 15 | 0.52 |
| Type 3 Ni-Resist Iron | 16 | 0.49 |
| Type 4 Ni-Resist Iron | 16 | 0.48 |
| Type 1 Ni-Resist Iron | 16 | 0.46 |
| Tobin Bronze | 14.5 | 0.40 |
| Copper | 31 | 0.36 |
| Red Brass | 14.5 | 0.33 |
| Aluminum Brass | 14.5 | 0.32 |
| "G" Bronze | 14.5 | 0.31 |
| Admiralry Brass | 19.9 | 0.29 |
| 90-10 Cu-Ni + 0.8 Fe | 15 | 0.28 |
| 70-30 Cu-Ni + 0.45 Fe | 15 | 0.25 |
| Type 430 Stainless Steel (Active) | 15 | 0.22 |
| Type 316 Stainless Steel (Active) | 15 | 0.18 |
| Inconel nickel-chronium alloy | 15 | 0.17 |

TABLE I-continued

[4] Galvanic Series of Various Alloys in Seawater Flowing at 4 m/s (23 to 27° C.)

| Material | Days in Test | Potential, volt vs SCE[1] |
|---|---|---|
| Type 410 Stainless Steel (Passive) | 15 | 0.15 |
| Type 410 Stainless Steel (Passive) | 15 | 0.15 |
| Titanium | 41 | 0.15 |
| Type 504 Stainless Steel (Passive) | 15 | 0.08 |
| Hasteiloy "C" | 15 | 0.079 |
| Momel nickel-copper alloy | 6 | 0.075 |
| Type 316 Stainless Steel (Passive) | 15 | 0.05 |

[1]SCE = Saturated calomel electrode

What is claimed is:

1. A method for reducing flow resistance in pipes or ducts by imposing a direct current (DC) electric potential on a wall of the pipe or duct in order to remove electric contribution to a friction factor stemming from an electric double layer of variable potential, where the imposed DC electric potential is regulated by a regulating unit fed with information of measured fluid properties, the method comprising:

constantly regulating the imposed DC electric potential so that the imposed DC-potential has a strength equal to and a polarity opposed to the variable potential of the double layer due to build-up of electrical charges on the wall from the interaction between the flowing fluid and the wall.

2. The method according to claim 1, wherein the regulating unit is fed with information of measured fluid properties upstream of a part of the pipe or duct that is exposed to the DC field, and the measured fluid properties may be one or more of the properties contained in the group consisting of average flow velocity, corrosion potential, pH, concentration of specific ions contained in the fluid, electrical conductivity, pressure, and temperature.

3. The method according to claim 1 or claim 2, wherein the DC electric potential is in the range of −1.5 to +1.5 V saturated calomel electrode (SCE).

4. The method according to claim 3, wherein the DC electric potential is in the range 550 to 650 mV (SCE) for steel pipes of a type employed in hydroelectric power plants and fresh water, and in the range 100 to 150 mV (SCE) for oil flowing in the same pipe.

5. The method according to claim 3, wherein the DC electric potential is in the range 50 to 100 mV (SCE) for fresh water flowing in a stainless steel pipe.

6. The method according to claim 3, wherein the DC electric potential is 75 mV (SCE) for fresh water flowing in a stainless steel pipe.

7. The method according to claim 3, wherein the flow is a streaming pure fluid in a gas or liquid state, a colloidal fluid, a fluid containing particles, or a mixture of several fluids, in single or multi-phase.

8. The method according to claim 3, wherein the flow is a stream of particles.

9. The method according to claim 3, wherein the flow has Reynolds numbers in the range 1 to 5,000,000.

* * * * *